C. G. BUSSEY.
DIRECTION SIGNAL FOR MOTOR VEHICLES.
APPLICATION FILED NOV. 9, 1921.
1,434,326.
Patented Oct. 31, 1922.
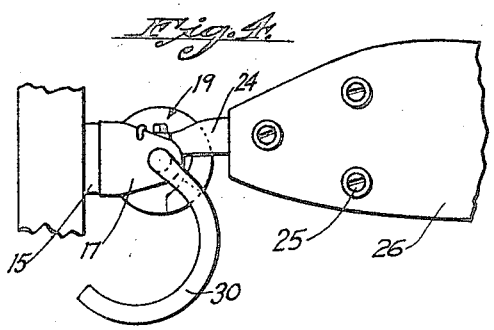
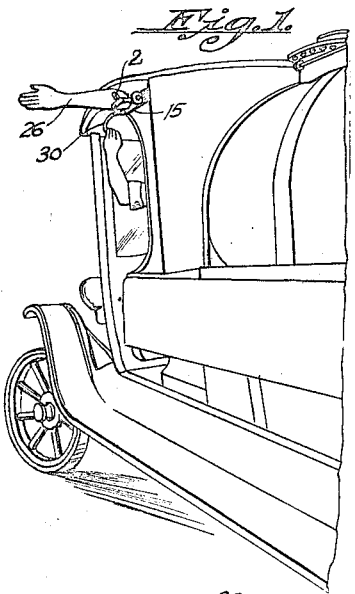
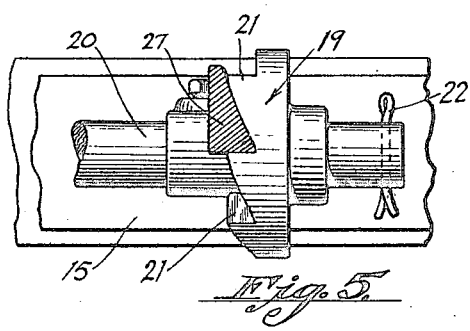
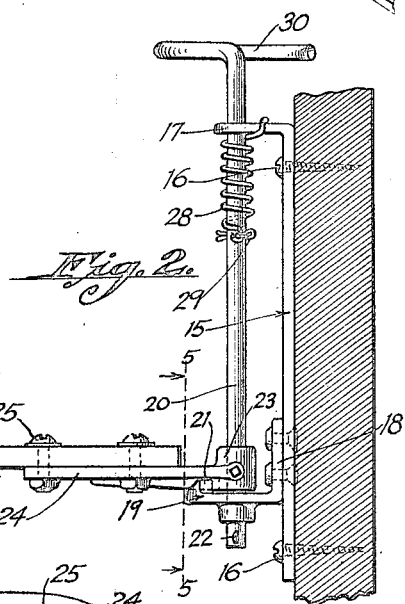
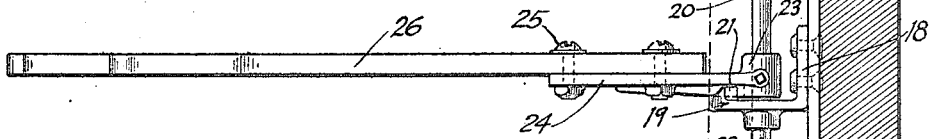
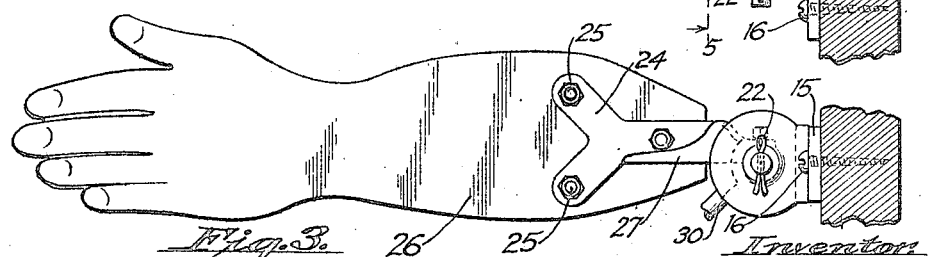
Inventor
CLYDE G. BUSSEY
BY Hazard & Miller
Attorneys Patented Oct. 31, 1922.

1,434,326

UNITED STATES PATENT OFFICE.

CLYDE G. BUSSEY, OF LOS ANGELES, CALIFORNIA.

DIRECTION SIGNAL FOR MOTOR VEHICLES.

Application filed November 9, 1921. Serial No. 513,949.

*To all whom it may concern:*

Be it known that I, CLYDE G. BUSSEY, a citizen of the United States, residing at Los Angeles, in the county of Los Angeles and State of California, have invented new and useful Improvements in Direction Signals for Motor Vehicles, of which the following is a specification.

My invention relates to signals for motor vehicles adapted to indicate the direction in which the vehicle is about to turn, and the purpose of my invention is the provision of a signal more particularly adapted to motor trucks, the invention being of simple, durable and inexpensive construction and readily operated to clearly indicate the intentions of the driver.

I will describe one form of direction signal for motor vehicles embodying my invention and will then point out the novel features thereof in claims.

In the accompanying drawings,

Figure 1 is a view showing in perspective a motor vehicle having applied thereto one form of signal embodying my invention.

Fig. 2 is an enlarged detail view showing in top plan the signal shown in Fig. 1.

Fig. 3 is a view showing in rear end elevation the signal shown in Fig. 2.

Fig. 4 is a fragmentary view similar to Fig. 3 showing the opposite end of the signal.

Fig. 5 is an enlarged fragmentary view showing the locking means comprising the signal shown in the preceding views.

Similar reference characters refer to similar parts in each of the several views.

Referring specifically to the drawings, my invention, in its present embodiment, comprises a support 15 which is in the form of an elongated plate adapted to be secured to a motor vehicle by means of screws 16 and having one end thereof bent at right angles to provide a bearing ear 17. Adjacent the lower end of the support 15 is riveted an extension 18 constituting an integral portion of a head 19 which, as illustrated to advantage in Fig. 5, is of disc form and provided axially thereof with an opening through which extends one end of a shaft 20. This head is provided at its upper side with a series of teeth 21 all extending in the same direction and arranged in the form of an arc.

The shaft 20 is also journaled in the ear 17, the mounting of the shaft being such as to allow of rotational and longitudinal movements thereof. A cotter pin 22 extends through the lower end of the shaft for preventing upward displacement thereof as will be understood.

Keyed or otherwise secured to the shaft 15 at a point directly above the head 19 is a sleeve 23 constituting a part of a yoke 24 having a bifurcated outer end through which bolts 25 extend for securing one end of an indicating arm 26. This yoke also includes a tooth or lip 27 adapted to engage any one of the teeth 21 for locking the yoke and consequently the arm 26 in a predetermined position.

The arm 26 is preferably made in the form of a human forearm and hand and is constructed of some light material, such as wood, or the like.

For yieldingly urging the shaft 20 longitudinally within the support so that the lip 27 will normally engage one of the teeth 21, a coiled expansible spring 28 is provided and which, as shown in Fig. 2, is arranged around the shaft and between a cotter pin 29 and the bearing ear 17. The spring functions to urge the shaft in the direction of the head 19, but is of such a tension as to permit of the manual moving of the shaft longitudinally so as to disengage the lip 27 from the teeth 21. This is accomplished through the medium of a handle 30 formed by bending one end of the shaft in the manner clearly shown in Fig. 4.

In the application of the signal to a motor vehicle, the supporting plate 15 is secured in horizontal position to the top of the vehicle, or at any other point which will dispose the handle 30 in convenient reach of the operator. In the present instance, the head 19 is provided with three teeth 21, each of which is adapted to co-operate with the lip 27 in securing the arm 26 in any one of the three usual indicating positions.

To operate the signal, it is necessary to move the shaft 20 forwardly and against the tension of the spring 28 until the lip 27 is disengaged from the teeth 21. With the shaft in this position it can now be rotated to cause the arm to occupy any one of the three indicating positions. After the arm has been moved to the desired position, the handle 30 is released thereby permitting the shaft to return to its normal position under the action of the spring 28 and to thereby cause the lip to again engage one of the teeth 21. This obviously secures the arm in the desired indicating position. As the arm is made to simulate the human arm, and so positioned as to extend laterally from the vehicle, it will be manifest that a clear and unmistakable indication of the driver's intentions can at all times be had.

Although I have herein shown and described only one form of signal embodying my invention, it is to be understood that various changes and modifications may be made herein without departing from the spirit of the invention and the spirit and scope of the appended claims.

What I claim is:

1. A signal of the character described comprising a support having one end bent to provide a bearing ear, a head secured to the support at the opposite end from the ear, a shaft rotatably and slidably mounted in the ear and head, a series of teeth on the head arranged in the form of an arc, an operating handle formed on one end of the shaft, a yoke keyed to the shaft and having a lip adapted to engage any of the teeth of said head, an indicating arm secured to the yoke, and a spring associated with the shaft for yieldingly urging the latter longitudinally to a position wherein said lip will be engaged by said teeth.

2. A signal of the character described comprising a support having one end bent to provide a bearing ear, a shaft rotatably and slidably mounted in the ear, a series of latching members sustained on the support, an operating handle on one end of the shaft, a yoke fastened to the shaft and having a lip adapted to engage any of the latching members, an indicating arm secured to the yoke, and a spring associated with the shaft for yieldingly urging the latter longitudinally to a position wherein the lip will be engaged by the latching members.

In testimony whereof I have signed my name to this specification.

CLYDE G. BUSSEY.